(12) United States Patent
Allen

(10) Patent No.: US 6,170,804 B1
(45) Date of Patent: Jan. 9, 2001

(54) METHOD AND APPARATUS FOR INTRODUCING A CABLE INTO A CONDUIT

(75) Inventor: Jerry L. Allen, Westfield Center, OH (US)

(73) Assignee: TVC Communications, Inc., Hershey, PA (US)

(*) Notice: Under 35 U.S.C. 154(b), the term of this patent shall be extended for 0 days.

(21) Appl. No.: 09/410,791

(22) Filed: Oct. 1, 1999

Related U.S. Application Data

(62) Division of application No. 09/007,347, filed on Jan. 15, 1998.

(51) Int. Cl.[7] .................................................. B65H 59/00

(52) U.S. Cl. ........................ 254/134.4; 254/134.4 R

(58) Field of Search ..................... 254/134.3 R, 134.4; 405/154, 37

(56) References Cited

U.S. PATENT DOCUMENTS 6,019,351 * 2/2000 Allen ................................. 254/134.4

* cited by examiner

Primary Examiner—James G. Smith
Assistant Examiner—Lee Wilson
(74) Attorney, Agent, or Firm—Renner, Kenner, Greive, Bobak, Taylor & Weber

(57) ABSTRACT

A new cable (16) may be introduced into a conduit (11) having an existing cable (13) therein by splicing the conduit (11) to form conduit ends (11A, 11B) with the existing cable (13) extending therebetween. The new cable (16) is positioned in a conduit section (58). A piston (67) may be attached to the leading end of the new cable (16) and is positioned in the conduit (11). A block (15) encloses the conduit ends (11A, 11B) and one end of the conduit section (58). The other end of the conduit section (58) is attached to a blower (70) which provides air under pressure through the conduit section (58), through the block (15) and against the piston (67) to position the new cable (16) in the conduit (11).

23 Claims, 4 Drawing Sheets

METHOD AND APPARATUS FOR INTRODUCING A CABLE INTO A CONDUIT

This application is a division of application Ser. No. 09/007,347, filed Jan. 15, 1998.

TECHNICAL FIELD

This invention relates to a method and apparatus by which a cable, such as a fiber optic cable or the like, can be introduced into or otherwise installed in an underground conduit or casing. More particularly, this invention relates to such a method and apparatus which is particularly suited for conduit which is already in place underground and which already is carrying one or more existing cables.

BACKGROUND ART

It is common practice to provide cable, such as telephone, electric or other utility cables, in a network of plastic conduits buried underground. The installation of such conduits and the introduction of cables therein is obviously a time-consuming and expensive task. For any such installation, many of which extend for many miles, first the conduit must be buried underground and then the cable must be installed in the conduit. Traditionally, such cable is installed by first blowing a rope through the conduit, then attaching the cable to the rope, and then pulling the rope to insert the cable into the conduit.

Today, millions of miles of underground conduits having a cable in place exist throughout the world. However, the ever-expanding telecommunications systems often require that additional networks be put in place, networks which might even parallel an existing network. Although existing conduits are large enough to house more than one cable, because there is no known efficient way to introduce another cable into an existing conduit, another entire system of conduit must first be placed underground and a new cable installed therein. The need exists, therefore, to be able to easily and efficiently install an additional cable in an existing conduit to avoid the redundancy of multiple complete conduit/cable networks, without damage to the cable already in the conduit.

DISCLOSURE OF THE INVENTION

It is therefore an object of the present invention to provide a method and apparatus for introducing a cable into a conduit.

It is another object of the present invention to provide a method and apparatus, as above, in which the cable can be introduced into a conduit which is already in place underground.

It is a further object of the present invention to provide a method and apparatus, as above, in which the cable may be introduced into a conduit which already has at least one other cable therein.

It is an additional object of the present invention to provide a method and apparatus, as above, which will not damage existing cable in place.

These and other objects of the present invention, as well as the advantages thereof over existing prior art forms, which will become apparent from the description to follow, are accomplished by the improvements hereinafter described and claimed.

In general, a method of introducing a new cable into an underground conduit already having at least one existing cable therein includes the steps of splicing the conduit to provide two conduit ends with the existing cable extending therebetween. The new cable is positioned in a conduit section having two ends. The leading end of the new cable is positioned in the conduit. The two conduit ends and one end of the conduit section are enclosed in a block. The other end of the conduit section is attached to a source of air under pressure whereby pressurized air is provided through the conduit section, through the block, and around the new cable to position the new cable in the conduit.

The block for housing the ends of the spliced conduit and the end of the conduit section includes a first block section, a second block section, and means to attach the two sections. When so attached, a first aperture is formed to receive one end of the conduit, a second aperture is formed to receive the other end of the conduit, and a third aperture is formed to receive the conduit section.

A preferred exemplary method of introducing a cable into a conduit, and the apparatus employed to accomplish the same, incorporating the concepts of the present invention, is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
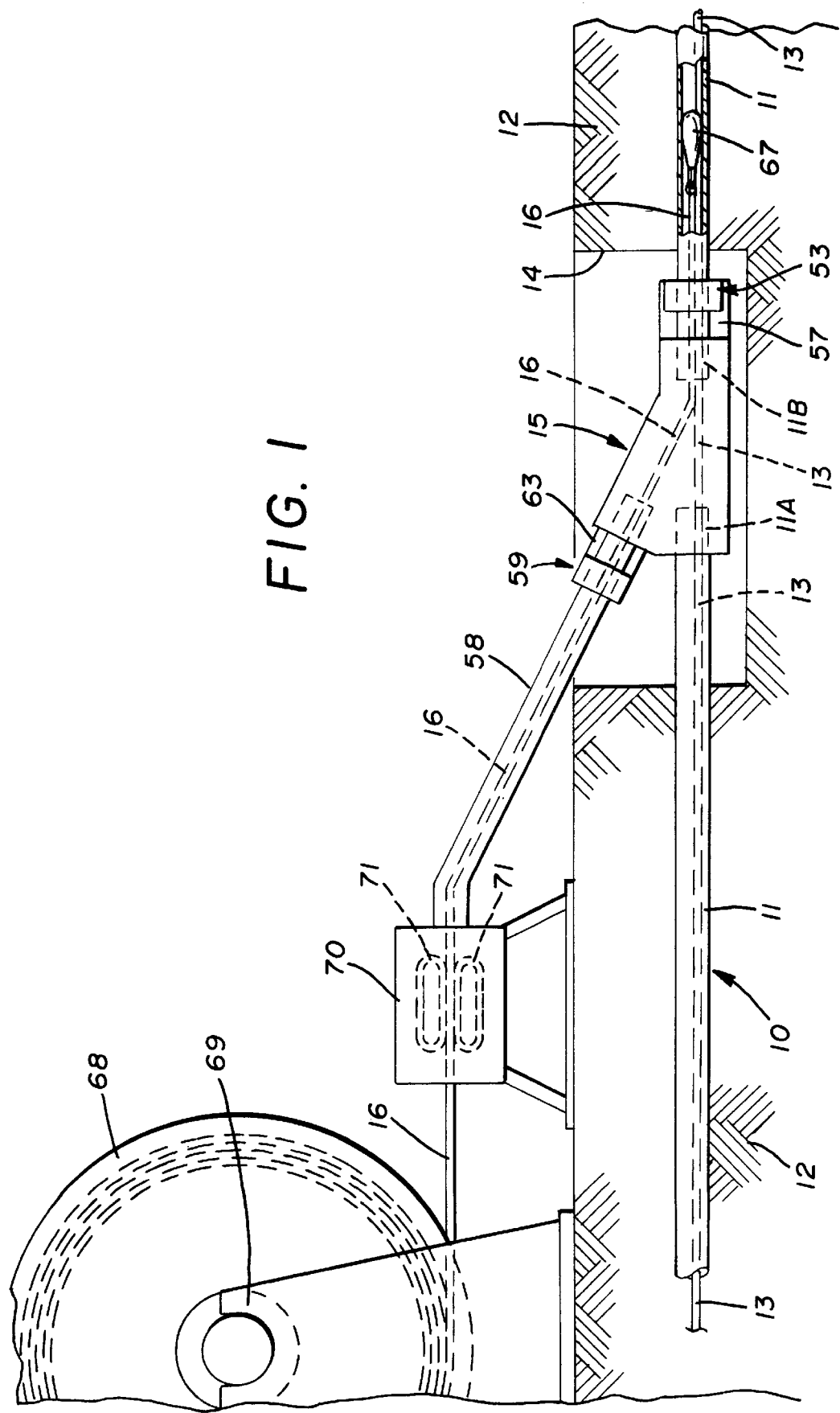
FIG. 1 is a fragmented, somewhat schematic representation of a system whereby a cable may be inserted into an underground conduit having an existing cable therein.

A typical underground conduit network is schematically shown in FIG. 1 and generally indicated by the numeral 10. Network 10 including a longitudinally extending casing or conduit 11, typically made of a sturdy plastic material of two or four inches in diameter. Conduit 11 is shown as being buried in the ground 12 and is carrying a cable 13 therein. Conduit 11 and its cable 13 typically extend several thousand feet, and network 10 commonly includes periodically spaced access areas, such as a manhole 14, schematically shown in FIG. 1.

A coupling block made in accordance with the present invention is indicated generally by the numeral 15 and is utilized at the area of a manhole 14, in conjunction with other elements, to introduce another cable 16 into conduit 11. Coupling block 15 is shown in detail in FIGS. 2–4 and is longitudinally split, as at 17, into two sections generally indicated by the numerals 18 and 19.

Section 18 is formed of a metallic material having a flat back wall 20 with opposed peripheral flanges 21 extending therefrom toward section 19. The area between flanges 21 is dished out, as at 22, to house certain components to be hereinafter described. Section 19 is likewise formed of a metallic material and includes a flat back wall 23 with opposed peripheral flanges 24 extending therefrom toward flanges 21 of section 18. The area between flanges 24 is dished out, as at 25, and combines with dished out area 22 to house the system components. Flanges 21 and 24 mate with each other to hold sections 18 and 19 together by means of bolts 26 extending through aligned apertures 27 and 28 formed in flanges 21 and 24, respectively. Pins 29 formed in flanges 21 are received in holes 30 formed in flanges 24 to assist in the proper alignment of apertures 27 and 28. The face of flanges 24 which engages flanges 21 are provided with rubber seal strips 31 which assist in rendering coupling block 15 air tight, because, as will hereinafter be described, block 15 is provided with air under pressure.

Figure 2:
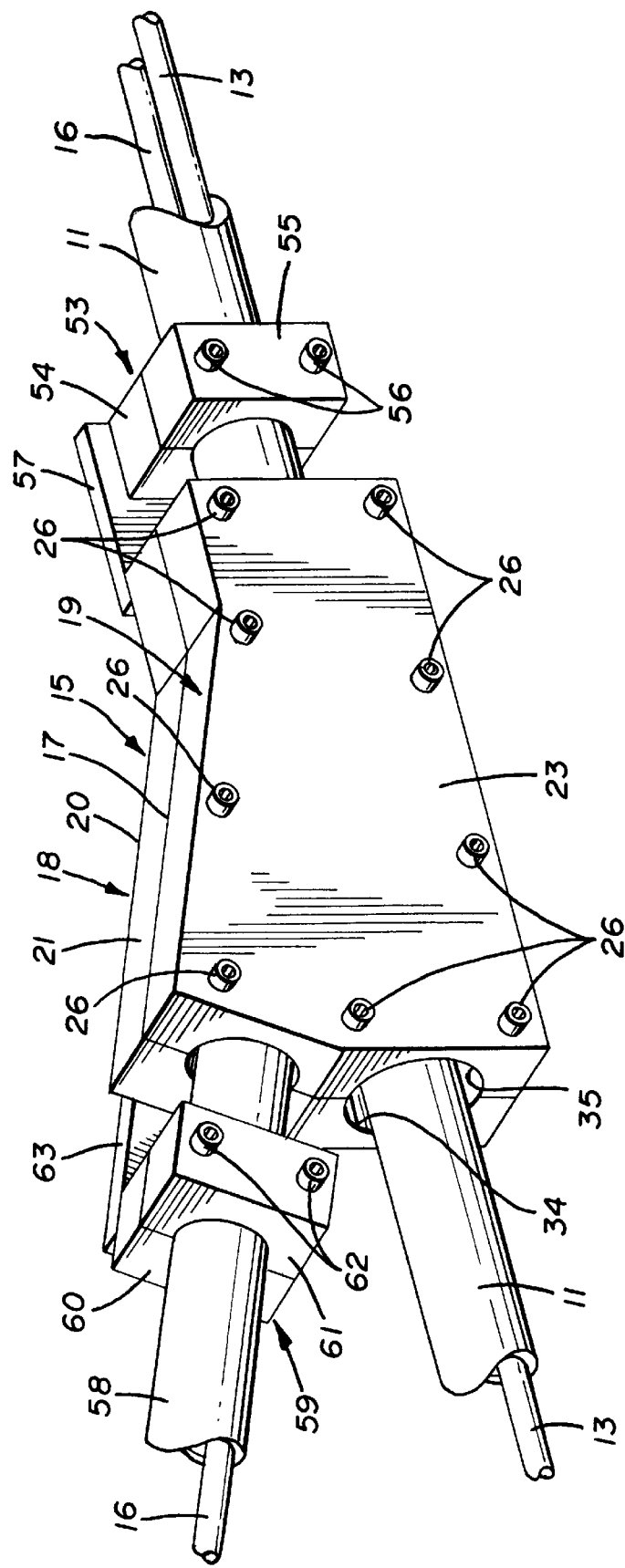
FIG. 2 is a fragmented perspective view of a coupling block utilized in the system shown in FIG. 1.

As best shown in FIG. 2, coupling block 15 is designed to receive both the existing cable 13 and the new cable 16 therethrough. In order to position block 15 over the existing cable 13 and conduit 11, first conduit 11 must be spliced, having a section thereof removed thereby forming a conduit end 11A extending into block 15 and a conduit end 11B extending out of block 15 with a portion of cable 13 being exposed therebetween. To receive input conduit end 11A, section 18 is provided with a wedge-shaped flange, generally indicated by the numeral 32, positioned between flanges 21 and extending into dished out area 22. Similarly, section 19 is provided with a mating wedge-shaped flange, generally indicated by the numeral 33, positioned between flanges 24 and extending into dished out area 25.

A semi-cylindrical recess 34 is formed between flange 21 and wedge-shaped flange 32 and a mating semi-cylindrical recess 35 is formed between flange 24 and wedge-shaped flange 33 to form an aperture to receive conduit end 11A therein. A semi-cylindrical stop surface 36 is formed on flanges 21 and 32, and a mating semi-cylindrical stop surface 37 is formed on flanges 24 and 33 to locate the end of conduit end 11A. Wedge-shaped flanges 32 and 33 are provided with notches 38 and 39, respectively, to receive a sealing system generally indicated by the numeral 40. Sealing system 40 can be of any conventional type which fits around cable 13 and seals the opening between cable 13 and conduit end 11A so that air under pressure in block 15 does not flow back through conduit 11. The sealing system 40 shown can include a plurality of alternating split rings 41 and U-shaped rings 42 which are received around cable 13 and which are preferably made of a felt-like material which can flex to tightly engage cable 13. Sealing system 40 is supported at its inner edge by the end 43 of a block 44 formed in section 19.

A semi-cylindrical recess 45 is formed between flanges 21 of block portion 18 and a corresponding semi-cylindrical recess 46 is formed between flanges 24 of block portion 19 to receive a sealing system 47. Sealing system 47 can be like sealing system 40 or can be of any suitable type to seal the area around the outside of conduit end 11B which is received in the aperture formed by mating recesses 45 and 46. Thus, conduit ends 11A and 11B are aligned as they extend through the apertures formed in block 15. The inner edge of conduit end 11B may be longitudinally located within block 15 by a shoulder 48 formed in flange 21 and corresponding shoulders 49, 50 formed in block portion 19, shoulder 49 being formed at the end of block 44, and shoulder 50 being formed at the edge of a rib 51 carried by flange 24 of block portion 19.

Conduit end 11B is held by a clamp, generally indicated by the numeral 53, which includes clamp halves 54 and 55 held together by bolts 56. A mounting plate 57 is attached by suitable fasteners (not shown) to block section 18 and carries, by suitable fasteners (not shown), clamp half 54. As such, conduit end 11B cannot move relative;to block 15 as could be the case when air under pressure in block 15 would bear against the inner edge of conduit end 11B.

The new cable 16 to be installed in conduit 11 is itself housed in a section of conduit 58 which is clamped to block 15 by a clamp generally indicated by the numeral 59. Clamp 59 includes clamp halves 60, 61 held together by bolts 62. A mounting plate 63 is attached by suitable fasteners (not shown) to block section 18 and carried, by suitable fasteners (not shown), by clamp half 60. As such, conduit section 58 cannot move relative to block 15 as could be the case when air under pressure in block 15 would bear against the inner edge of conduit section 58.

Conduit section 58 extends into coupling block 15 and is received through an aperture formed by a semi-cylindrical recess 64 formed between a flange 21 and wedge-shaped flange 32 of block portion 18 and a corresponding semi-cylindrical recess 65 formed between a flange 24 and wedge-shaped flange 33 of block portion 19. An O-ring 66 may be positioned in recesses 64 and 65 to provide an air-tight seal between conduit section 58 and block portions 18 and 19. As shown, the aperture formed by recesses 64 and 65 is oriented so that conduit section 58 enters block 15 at an angle relative to conduit ends 11A and 11B so that cable 16 is directed downwardly toward conduit end 11B.

Figure 3:
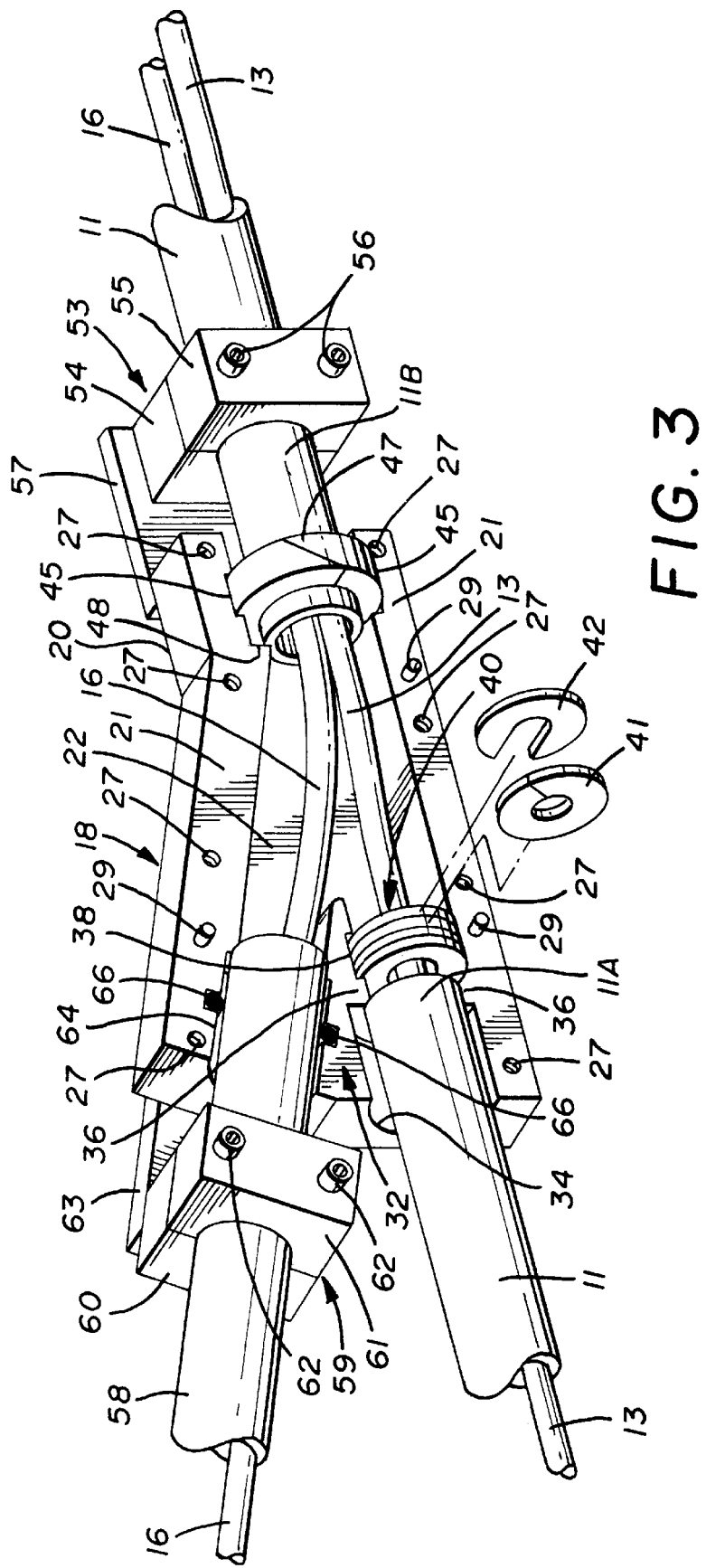
FIG. 3 is a fragmented perspective view of the coupling block of FIG. 1 having one portion thereof removed.
Figure 4:
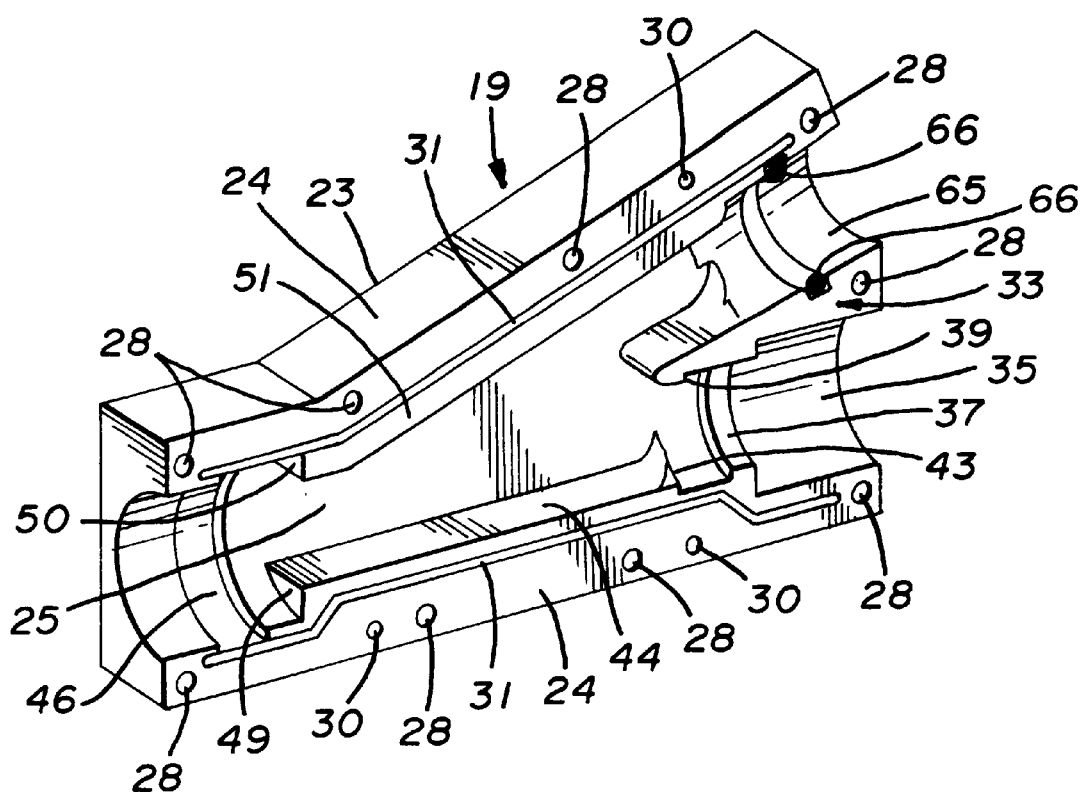
FIG. 4 is a perspective view of the inside of the portion of the coupling block not shown in FIG. 3.

The manner in which coupling block 15 is utilized to introduce the new cable 16 into conduit 11 already having cable 13 therein will now be described in detail. As previously described, conduit 11 is spliced and a portion thereof removed at an access area such as at manhole 14. Conduit ends 11A and 11B, as well as the end of conduit section 58, are positioned in one of block portions 18 or 19, as shown in FIG. 3.

A piston, as it is known in the art, shown in FIG. 1 to be a parachute-like device 67, may, if desired, be attached to the leading end of new cable 16, it being understood that any conventional piston-like device could be utilized to propel cable 16 through conduit 11. Cable 16 with its piston 67 is then positioned into conduit 11, as shown in FIG. 1, and the components are now situated in block portion 18 as shown in FIG. 3. Then block portion 19 may be attached to block portion 18, as previously described, to provide the air-tight block 15.

A supply of new cable 16, usually consisting of 15 thousands of feet, is provided on a coil 68 carried by a conventional reel 69 positioned above ground 12. Cable 16 from coil 68 is provided to a conventional cable blowing unit 70, for example, of the type sold by Vikimatic Sales, Inc. of Wadsworth, Ohio. Unit 70 may also be of the type shown in U.S. Pat. No. 4,850,569, to which reference is made for whatever details described therein may be necessary for the full understanding of the operation of unit 70. Briefly, unit 70 can utilize caterpillar-like drive members 71 to engage and move cable 16. In addition, unit 70 also provides compressed air to move cable 16. To this end, the end of conduit section 58 opposite to the end received in block 15 is attached to unit 70 with a suitable air-tight seal (not shown) being provided. Thus, air under pressure is provided through conduit section 58 and into block 15. Because all portions of block 15 are sealed, except the entrance to conduit end 11B, the air under pressure enters conduit 11 at conduit end 11B and acts on piston device 67 to move cable 16 into conduit 11. As previously mentioned, piston device 67 may not be necessary to perfect the positioning of cable 16 into conduit 11. Rather, if the air under pressure is sufficient, its movement past cable 16 can be sufficient to move cable 16. However, the use of a piston device 67 is preferable for the most efficient movement of cable 16. During such movement, the existing cable 13 is not disturbed, nor does it disturb the entrance of cable 16 because cable 16 effectively floats past and over cable In view of the foregoing, it should thus be evident that a system constructed and operated in accordance with the above description accomplishes the objects of the present invention and otherwise substantially improves the art.

What is claimed is:

1. Apparatus for housing two ends of a spliced conduit having a first cable extending therebetween and an end of a conduit section having a second cable extending therethrough comprising a first block section, a second block section, and means to attach said first block section to said second block section such that when said sections are attached a first aperture is formed to receive one end of the spliced conduit, a second aperture is formed to receive the other end of the spliced conduit, and a third aperture is formed to receive the conduit section.

2. Apparatus according to claim 1 wherein said first and second apertures are aligned with each other and said third aperture is angled relative to the line between said first and second apertures.

3. Apparatus according to claim 1 further comprising opposed flanges formed in said first block section, and corresponding opposed flanges formed in said second block section.

4. Apparatus according to claim 3 further comprising a seal positioned between said opposed flanges of said block sections and around one end of said conduit.

5. Apparatus according to claim 3 wherein said opposed flanges of said first block section mate with said opposed flanges of said second block section when said sections are connected, and further comprising a seal between said opposed flanges of said block sections.

6. Apparatus according to claim 3 wherein said opposed flanges of said block sections are shaped to form said second aperture.

7. Apparatus according to claim 3 further comprising a wedge-shaped flange formed in said first section between said opposed flanges of said first section and a corresponding wedge-shaped flange formed in said second section between said opposed flanges of said second section.

8. Apparatus according to claim 7 wherein said wedge-shaped flanges and said opposed flanges define said first and third apertures.

9. Apparatus according to claim 7 further comprising a seal positioned between said wedge-shaped flanges and one of said opposed flanges of each said block section, said seal being positioned around the first cable.

10. Apparatus according to claim 7 further comprising a seal positioned between said wedge-shaped flanges of each said block section, said seal being positioned around said conduit section.

11. Apparatus according to claim 1 further comprising a clamp carried by one of said block sections, said clamp engaging the conduit outside of said block sections.

12. Apparatus according to claim 1 further comprising a clamp carried by one of said block sections, said clamp engaging the conduit section outside of said block sections.

13. Apparatus according to claim 1 wherein said means to attach includes bolts extending through apertures formed in said block sections.

14. Apparatus according to claim 13 wherein said means to attach includes pins extending from one of said block sections and holes formed in the other of said block sections, said pins being received in said holes to align said block sections.

15. A system for introducing a new cable into an underground conduit already having at least one existing cable therein comprising a conduit section carrying the new cable, a coupling block housing one end of said conduit section and an open end of the conduit, and a blower attached to the other end of said conduit section, said blower providing air under pressure through said conduit section, through said block, and around the new cable to position the new cable in the conduit.

16. A system according to claim 15 further comprising a reel carrying a supply of the new cable, said blower receiving the new coil from said reel.

17. A system according to claim 16 further comprising a clamp carried by said block, said clamp engaging said end of the conduit outside of said block.

18. A system according to claim 15 further comprising a clamp carried by said block, said clamp engaging said conduit section outside of said block.

19. A system according to claim 15 further comprising means to seal said block so that the air under pressure received by said block may only pass through said open end of the conduit.

20. A system according to claim 19 wherein said block includes a first block section attached to a second block section and said means to seal includes seal strips between said sections.

21. A system according to claim 20 wherein said means to seal includes a sealing system between said sections and said end of the conduit.

22. A system according to claim 20 wherein a second end of said conduit is received by said block, the existing cable extending between said second end and said open end, said means to seal including a sealing system between said existing cable and said second end.

23. A system according to claim 15 further comprising a piston attached to the leading end of the new cable, the air under pressure acting against said piston.

* * * * *